US008316643B2

(12) United States Patent
Sakurai et al.

(10) Patent No.: US 8,316,643 B2
(45) Date of Patent: Nov. 27, 2012

(54) METHOD OF DRIVING AND DRIVE MECHANISM UTILIZING SURFACE TENSION DIFFERENCE CONVECTION GENERATED IN TWO FLUIDS HAVING AN INTERFACE

(75) Inventors: Masato Sakurai, Tokyo (JP); Shoichi Yoshihara, Tokyo (JP); Mitsuru Onishi, Tokyo (JP)

(73) Assignee: Japan Aerospace Exploration Agency, Chofu-shi, Tokyo (JP)

( * ) Notice: Subject to any disclaimer, the term of this patent is extended or adjusted under 35 U.S.C. 154(b) by 2615 days.

(21) Appl. No.: 11/033,800

(22) Filed: Jan. 13, 2005

(65) Prior Publication Data
US 2005/0214110 A1   Sep. 29, 2005

(30) Foreign Application Priority Data
Jan. 16, 2004   (JP) .................................. 2004-9541

(51) Int. Cl.
*F01K 1/00* (2006.01)

(52) U.S. Cl. ................................ 60/643; 60/651; 60/721

(58) Field of Classification Search ............. 60/643, 60/645, 651, 671, 721
See application file for complete search history.

(56) References Cited

U.S. PATENT DOCUMENTS

| | | | |
|---|---|---|---|
| 5,590,711 A * | 1/1997 | Ishida et al. ............... | 165/179 |
| 5,730,001 A * | 3/1998 | Furukawa ................. | 62/485 |
| 2006/0094108 A1* | 5/2006 | Yoder et al. ............... | 435/287.2 |

FOREIGN PATENT DOCUMENTS

| | | |
|---|---|---|
| JP | 6-38561 | 2/1994 |
| JP | 2002-127100 | 5/2002 |

OTHER PUBLICATIONS

Abstract of a Conference Document, May 23-Jun. 2, 2002, Sakurai et al, Japan Society for Aeronautical and Space Sciences.*
Seungbae Hong, Luc G. Frechette and Vijay Modi "Numerical Simulation of Mixing in a Micro Channel with Nonuniform Zeta Potential Surface", Proceedings of the Micro Total Analysis System 2002, vol. 1, p. 94, 2002
Katsuhiko Fujinawa "Rayleigh Motion and Marangoni Motion" Kagaku Kogaku (Chemical Engineering) vol. 49, No. 11, pp. 896-901 (1985).
Sakura et al. "Primitive Study of a New Fluid Handling in Microgravity Condition" $23^{rd}$ International Symposium on Space Technology and Science, May 26-Jun. 2, 2002, Matsue, Japan.

* cited by examiner

*Primary Examiner* — Hoang Nguyen
(74) *Attorney, Agent, or Firm* — Westerman, Hattori, Daniels & Adrian, LLP

(57) ABSTRACT

An object of the present invention is to provide a method of driving a micromachine and a drive mechanism whereby the required drive force can be obtained and that avoid excessive load to the machine, the mechanism not being of large size and not being troublesome in terms of energy supply. In a micromachine rotary drive mechanism according to the present invention, a micro-turbine is floated on the liquid surface of Fluorinert, silicone oil is attached onto faces respectively directed in the same direction of this micro-turbine, thereby drive force of the micro-turbine is obtained from the surface tension difference convection generated at the two-fluid interface. Also, in a unidirectional drive mechanism of a micromachine according to the present invention, a minute thin sheet is floated on a Fluorinert liquid surface, silicone oil is attached to one end of this minute thin sheet, thereby drive force of this minute thin sheet is obtained from the surface tension difference convection generated at the two-fluid interface.

11 Claims, 6 Drawing Sheets

METHOD OF DRIVING AND DRIVE MECHANISM UTILIZING SURFACE TENSION DIFFERENCE CONVECTION GENERATED IN TWO FLUIDS HAVING AN INTERFACE

BACKGROUND OF THE INVENTION

1. Field of the Invention

The present invention relates to a method of creating a mechanical force as a novel fluid drive source by utilizing the surface tension difference convection that is spontaneously generated between two fluids having an interface, such as Fluorinert and silicone oil, and to a technique for applying this force to a micromachine.

2. Description of the Related Art

Nowadays processing at the micro level is required in a wide range of fields such as the semiconductor field or medical fields and various types of so-called micromachines have been developed to achieve this. Various microstructures are created by employing micro-optical molding or CVD techniques making use of an ion beam or electron beam for forming machine structures. However, regarding the mechanism for driving such micromachines, their very minuteness results in various circumstances which normally do not create problems becoming barriers which make it difficult to put such machines into practice. For example, on the micro scale, frictional force becomes dominant, so idle rotation disengaging the microdrive sources that have been developed up to the present from excessive load is difficult to achieve, giving rise to the problem of deformation or destruction of the machine.

In recent years, the μTAS (Micro Total Analyses) technique, in which a chromatograph and other items are incorporated on a chip of dimensions of a few centimeters in order to analyze minute samples of for example blood has come into favor. In view of the advantages such as that diagnosis of for example diseases can be performed at home, that only a very small sample is required, and that the results are immediately available, a new technical field is being established. However, when for example a test reagent is added to this μTAS, the physical phenomenon arises that the Reynolds number becomes small when the representative length becomes small, on account of increased viscous effects on the micro scale; as a result, laminar flow takes place on the μTAS, so that the reagent fails to mix with the sample. On the ordinary scale, there are techniques for facilitating the mixing of two liquids, but, on the μTAS, due to the fineness of the scale, it is difficult to mix two liquids. There is therefore an urgent demand for development of mixing mechanisms capable of being employed in the micro world. (See Seungbae Hong, Luc G. Frechette and Vijay Modi "Numerical simulation of mixing in a micro channel with nonuniform zeta potential surface": Proceedings of the Micro Total Analysis System 2002, Volume 1, p 94 (2002))

The present group of inventors carried out repeated studies based on the concept of utilizing Marangoni convection as a drive source for such micromachines. The Marangoni phenomenon refers to the phenomenon that the surface tension becomes nonuniform when a temperature gradient or concentration gradient is produced at an interface between gas and liquid, or to the phenomenon that flow is thereby created. For example, when a small piece of detergent or camphor is placed on a water surface, it dissolves in the water, changing the surface tension of the water and, as a result, the piece moves over the water surface. Most people will remember the sight of a small boat with a piece of camphor attached to it dashing about at a fete; this utilizes the Marangoni phenomenon. Also, when nonuniformity of temperature occurs at the surface of a liquid of high volatility, such as ether, flow similar to Bernard convection spontaneously occurs close to the surface, due to nonuniformity of surface tension; this is referred to as Marangoni convection.

Under microgravity and on the micro scale wettability and surface tension are dominant; the group of the present inventors, noting the similarity of these, studied handling of fluids by controlling wettability and/or surface tension. There are many examples of studies of surface tension difference convection because of the effect this has on crystal quality in single crystal growth of semiconductors. Also, under microgravity, natural convection disappears and, instead, surface tension difference convection is enhanced and has therefore been studied. Studies have also previously been made concerning the generation of Marangoni convection due to temperature differences, concentration differences and distribution of surface potential. (See Katsuhiko Fujinawa "Rayleigh motion and Marangoni motion" Kagaku Kogaku (Chemical Engineering) Vol. 49, No. 11, p 896 to p 901 (1985)) Although in previous studies, it was understood that Marangoni convection required a difference in temperature or a difference in concentration, with the combination of silicone oil and Fluorinert used in the present study (hereinbelow this will be referred to as a silicone oil/Fluorinert system), there is substantially no mixing of these two substances, so an interface is created and the liquid/liquid/gas Marangoni convection generated between the two liquids, namely silicone oil and Fluorinert on the one hand and the atmosphere (gaseous phase) on the other is generated solely where the two liquids make contact. This phenomenon overturns the conventional wisdom regarding Marangoni convection in that it does not require temperature difference or concentration difference and no reports at all of this phenomenon have so far appeared either in Japan or overseas. It is a major characteristic feature of the liquid/liquid/gas Marangoni convection that occurred in the present studies that it is generated solely by contact of two liquids. Although this phenomenon has not at present been fully analyzed, it is thought that the drive force is produced by evaporation of Fluorinert. Under conditions of exposure to the atmosphere, there is no possibility of saturated vapor pressure being reached if two-fluid contact of silicone oil and Fluorinert is performed and drive can therefore be achieved so long as Fluorinert is present; in this respect there is a considerable difference in comparison with other conventionally known types of Marangoni convection. It may be noted that it is a necessary condition in the case of a small boat that moves under the action of camphor that there should be a difference of concentration: when the concentration of camphor in the water reaches a prescribed value, the boat ceases to move.

SUMMARY OF THE INVENTION

As described above, in view of the demand for development of drive methods and drive mechanisms adapted to the micro scale in the field of micromachines, the problem of the present invention was to provide a method of driving and a drive mechanism for micromachines whereby the required drive force could be obtained and that avoid the possibility of the machine being subjected to excessive load, the mechanism not being of large size and not being troublesome in terms of energy sourcing.

A different problem of the present invention is to provide a technique for making it possible to suitably control the drive force of a micromachine.

In the method according to the present invention of creating drive force for a micromachine, the surface tension difference convection generated at the two-fluid interface of silicone oil and Fluorinert is utilized as the drive force of the micromachine.

Also, in a rotary drive mechanism for a micromachine according to the present invention, a micro-turbine is floated on a Fluorinert liquid surface and silicone oil is attached to faces of this micro-turbine that are respectively facing in the same direction, thereby enabling the surface tension difference convection generated at the two-fluid interface to produce drive force for the micro-turbine.

Also, a unidirectional drive mechanism of a micromachine according to the present invention involves floating a minute thin sheet on a Fluorinert liquid surface and attaching silicone oil at one end of this minute thin sheet, thereby causing the surface tension difference convection generated at the two-fluid interface to produce a drive force of this minute thin sheet.

Furthermore, in order to achieve reliable operation of this drive mechanism, it may be arranged that only the region, of the surface of the drive member onto which the silicone oil is to be attached, where the silicone oil is intended to adhere, should be treated with a material of good wettability whereas the entire peripheral region thereof should be treated with a material of poor wettability before the silicone oil drop is attached.

A method according to the present invention of stirring and mixing a plurality of fluids comprises inserting liquid drops of silicone oil and Fluorinert in a microchannel in which the plurality of fluids are flowing in a laminar flow condition, and performing stirring and mixing by surface tension difference convection generated at the interface of these two fluids. For example, silicone oil and Fluorinert liquid drops are inserted in a mixing region of sample and reagent on a μTAS chip, and stirring and mixing of the sample and reagent is achieved by generating surface tension difference convection at the interface of these two fluids.

Also, according to the present invention, in order to effect a desired adjustment of the drive force, there are provided a method of controlling the rate of surface tension difference convection by adjusting the temperature difference between the silicone oil and Fluorinert and a method of adjusting the speed of surface tension difference convection by adjusting the Fluorinert vapor pressure in the interface region of the silicone oil and Fluorinert.

Since, with the method of the present invention, surface tension difference convection generated at the two-fluid interface of silicone oil and Fluorinert is utilized as the drive force of a micromachine, a drive mechanism is constituted simply by inserting the two fluids, silicone oil and Fluorinert, so it is unnecessary to provide special members or energy supply means; this is therefore optimum for achieving extreme compactness.

Also, since the drive mechanism according to the present invention comprises a rotary drive mechanism wherein a micro-turbine is floated on the surface of Fluorinert liquid and drive force of the micro-turbine is produced by the surface tension difference convection generated at a two-fluid interface by attaching silicone oil on faces respectively facing in the same direction of this micro-turbine, or comprises a unidirectional drive mechanism wherein a minute thin sheet is floated on the surface of Fluorinert liquid and drive force of the minute thin sheet is produced by the surface tension difference convection generated at a two-fluid interface by attaching silicone oil at one end of this minute thin sheet, even if excess load is applied, this excess load can be absorbed by the convection and there is thus no possibility of excess load being applied to the machine and causing deformation or damage.

The drive mechanism according to the present invention wherein, of the surface of the drive member onto which silicone oil is to be attached, only the actual region to which it is intended that silicone oil should be attached is treated with a material of good wettability, the entire peripheral region thereof being treated with a material of poor wettability, makes it possible to attach a silicone oil liquid drop easily and reliably at a specified location where Marangoni convection is desired to be generated.

Also, the method according to the present invention whereby stirring and mixing of a plurality of fluids is performed by inserting liquid drops of silicone oil and Fluorinert in a microchannel in which the plurality of fluids are flowing in a laminar flow condition, and performing stirring and mixing by surface tension difference convection generated at the interface of these two fluids makes it possible to achieve effective stirring and mixing of the plurality of fluids in a laminar flow condition on the micro scale, since Marangoni convection can be generated in a micro-region. This technique enables effective stirring and mixing of the sample and reagent to be achieved when applied to mixing of the sample and reagent on a μTAS chip, where a method of effective mixing is demanded.

Furthermore, the provision according to the present invention of a technique for controlling the rate of surface tension difference convection by adjusting the temperature difference between the silicone oil and Fluorinert or adjusting the speed of surface tension difference convection by adjusting the Fluorinert vapor pressure in the interface region of the silicone oil and Fluorinert makes it possible to provide suitable drive force as required by a micromachine. Furthermore, in the case of adjustment of the Fluorinert vapor pressure, ON/OFF control can be achieved, since convection can be stopped under saturated vapor pressure.

DETAILED DESCRIPTION

Silicone oil and Fluorinert, which is a fluorine-based fluid, form an interface at which substantially no mutual solution takes place. In the programme of studies that were conducted for the present invention, the present inventors made tests of the effect of temperature difference on surface tension difference convection using these two fluids. The present inventors discovered that, when a drop of silicone oil was placed on the surface of Fluorinert, extremely rapid flow of some tens of millimeters per second was generated at the liquid/liquid interface. Initially, it was inferred that this was the result of surface tension difference convection caused by the difference of concentrations; however, when observation was continued, rapid flow continued to be generated in the liquid droplet and the vigor of this flow continued unabated even after the lapse of a time by which it would be thought that saturation uniformity of the concentration would have been complete. From the fact that this flow ceased when the container was hermetically sealed with Saran wrap, it is inferred that this flow is due to evaporation. However, the mechanism of the drive force i.e. why evaporation should give rise to a flow is unknown.

The invention presents a drive method and drive mechanism, which mechanism is not large, does not require a troublesome energy supply, yet enables the necessary drive force to be obtained, wherein a method of extracting mechanical force from surface tension difference convection current that is, as has been discovered by chance, spontaneously generated in this silicone oil and Fluorinert system is employed as the method of drive for a micromachine as described above. As shown in Laid-open Japanese Patent Application No. 2002-127100 or Laid-open Japanese Patent Application No. H. 6-38561, whereas conventional micromachine drive mechanisms required the supply of electricity, light or heat as an energy source, with the drive mechanism according to the present invention, so long as an interface of Fluorinert and silicone oil is present under a gaseous phase, the surface tension difference convection that is thereby spontaneously generated can be utilized as a drive source. This is therefore suitable as a drive source for extremely minute micromachines, since it is mechanically extremely simple and does not require an energy supply mechanism.

Figure 1:
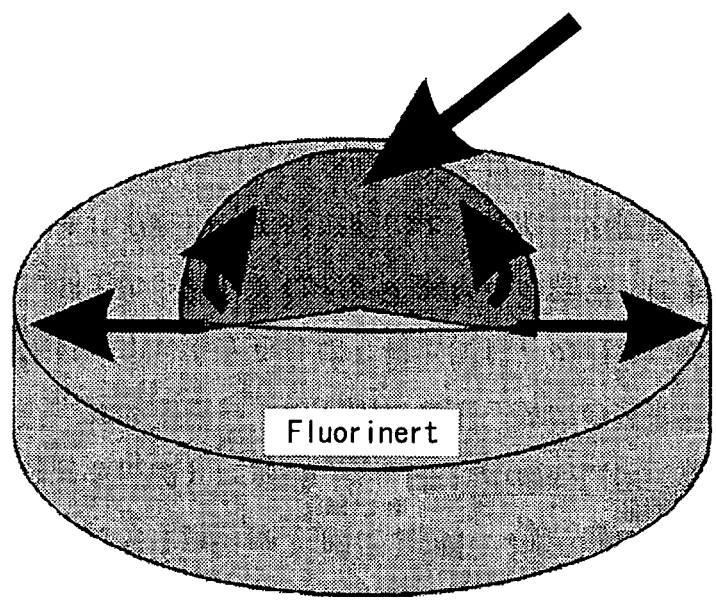
FIG. 1 is a diagram of surface tension difference convection generated in two liquids having an interface.

As shown in FIG. 1, Fluorinert, which is a fluon compound, is placed in a dish and a drop of silicone oil is allowed to fall onto it. Spontaneous flow is then generated as shown diagrammatically in FIG. 1. A thumbtack was then placed in the middle of the dish in a condition with the needle thereof directed vertically upwards; when a drop of silicone oil was allowed to fall onto this thumbtack needle, the drop of silicone oil clung to the thumbtack needle and could thereby be fixed in an immovable fashion.

Figure 2:
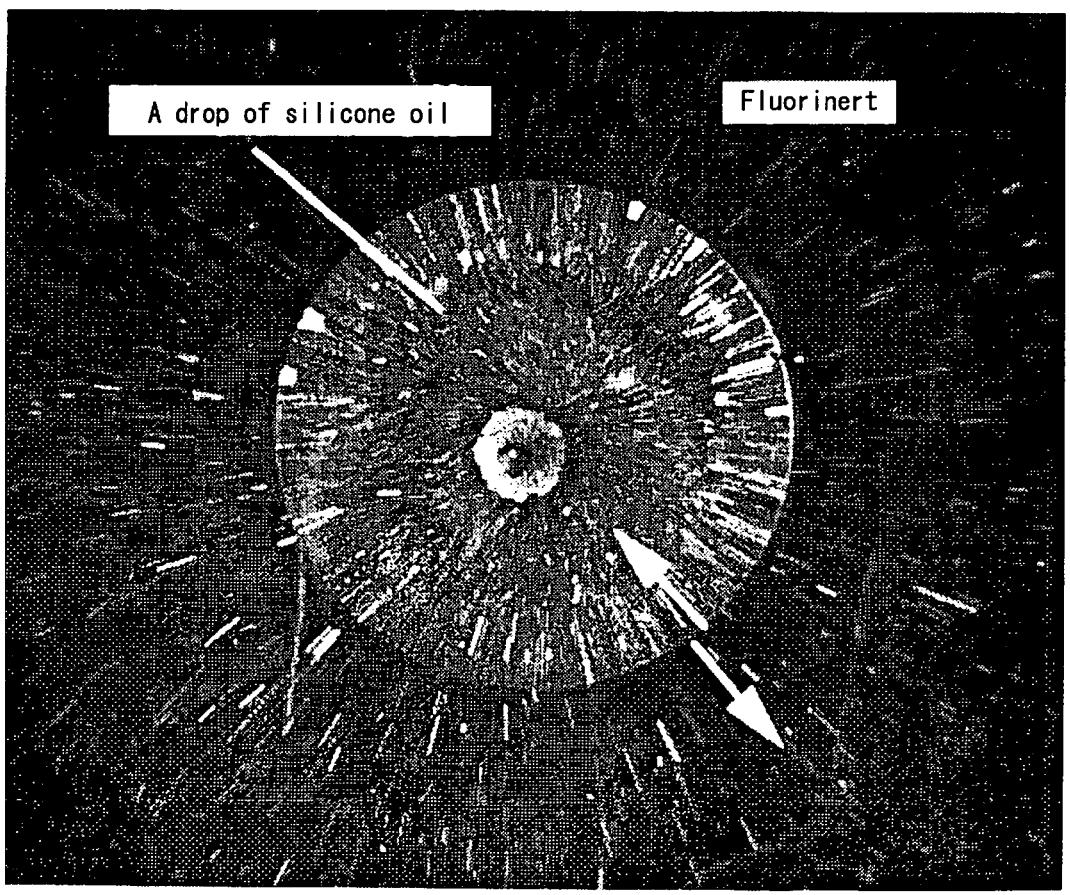
FIG. 2 is an image converted into visible form of flow lines of surface tension difference convection generated in two fluids having an interface.

FIG. 2 shows the flow lines of the spontaneous flow generated in a Fluorinert/silicone oil system, using a flow visualization tracer. The point in the middle of the Figure is the needle of the thumbtack and the circular region around this is the drop of silicone oil. As a result of observation, it is believed that the convection generation mechanism involves phenomena at the triple contact line of the silicone oil/Fluorinert/air. Tracer approaching the line of contact from the undersurface of the silicone oil drop flows along the silicone oil/air interface, being accelerated as if pulled by the triple contact line. Accompanying this, the Fluorinert has a radial flow field from the line of contact. From the fact that this flow phenomenon ceased when the container was hermetically sealed with Saran wrap, it is inferred that this flow phenomenon is due to evaporation. This silicone oil drop is of small thickness, being calculated as about 1 mm from the volume of the drop and its area.

Figure 3:
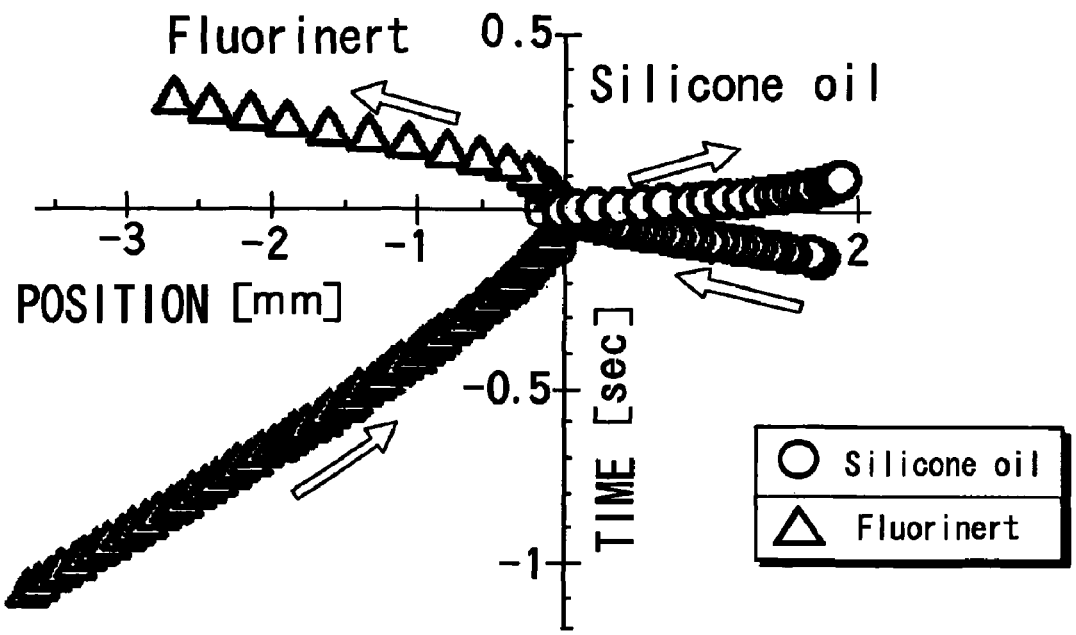
FIG. 3 shows a graph of position data for each time obtained by using a high-speed camera to pick up an image of the surface tension difference convection.

FIG. 3 shows the results of observation of the speed of this convection using a high-speed camera [250 frame/s]. The position data, taking the position of the interface as 0, is represented graphically on the horizontal axis, with the time being taken along the vertical axis. The flow position of the Fluorinert with lapse of time is represented by Δ symbols on the minus side on the left and the flow position of the silicone oil with lapse of time is represented by ○ symbols on the plus side on the right. When its position in a liquid drop was traced for each frame, tracer starting from the bottom of the middle of the drop was observed to advance along the silicone oil/Fluorinert liquid/liquid interface towards the triple contact line, being accelerated as if attracted by the triple content line. Subsequently this tracer flowed towards the middle of the top of the silicone oil drop, with somewhat reduced speed.

Figure 4:
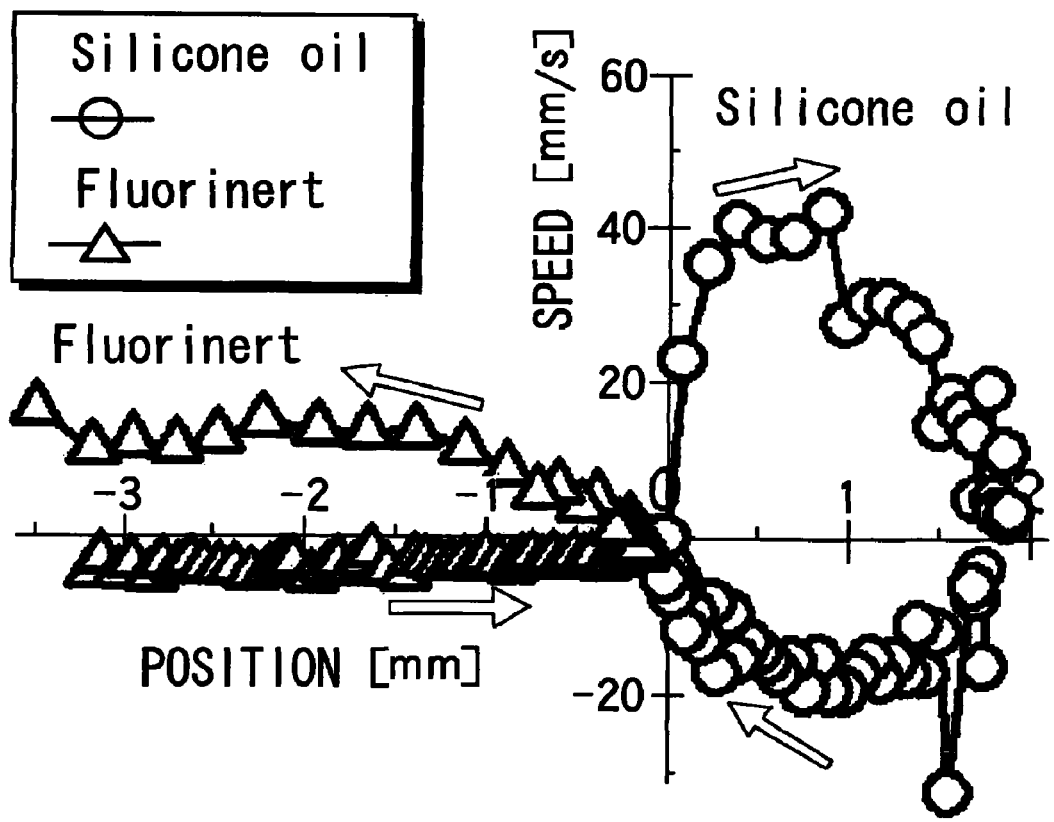
FIG. 4 shows a graph of low-speed distribution data corresponding to position obtained by using a high-speed camera to pick up an image of the surface tension difference convection.

The speed distribution is shown in FIG. 4. In the same way as in FIG. 3, the position data is represented graphically on the horizontal axis, with the speed data being taken along the vertical axis. In the case of the silicone oil, which is plotted with the ○ symbols on the right-hand side, speed from the line of contact towards the center of the drop is taken as positive and in the case of the Fluorinert, which is plotted using the Δ symbols on the left-hand side, the speed from the line of contact towards the outside is taken as positive. It can be seen that the speed of the Fluorinert/silicone oil interface is greater than the speed of the silicone oil/air interface. This is no doubt because mass balance of the flow is preserved, so the boundary layer on the silicone oil/air side decreases in thickness.

It was possible to confirm acceleration of the surface flow rate since the temperature difference Marangoni convection and surface tension difference convection generated in the two fluids are in the same direction when the needle of the thumbtack that is used for fixing purposes and that stands upright in the middle of the silicone oil drop, as described above, is cooled. Also contrariwise, deceleration of the surface flow rate was observed when the needle of the thumbtack used for fixing purposes was heated.

Figure 5:
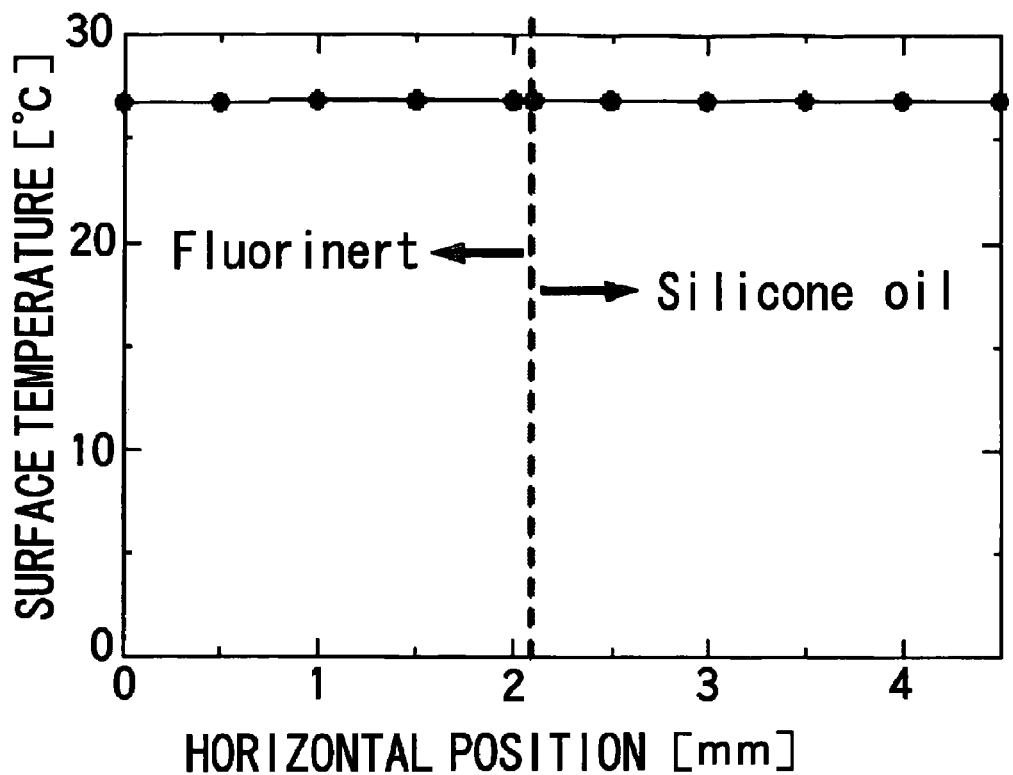
FIG. 5 is a graph showing the temperature distribution of the interface in surface tension difference convection.

FIG. 5 shows the results of surface temperature measurement that was then performed. In the graphical representation, position in the horizontal direction is taken along the horizontal axis and temperature is taken along the vertical axis. From the fact that, although the convection speed depends on the applied temperature, a temperature distribution of the surface was not observed when the observation of convection was carried out, it is clear that this phenomenon does not represent surface tension difference convection produced by temperature difference, as conventionally known, but rather represents a drive force based on a novel principle.

Embodiment 1

Figure 6:
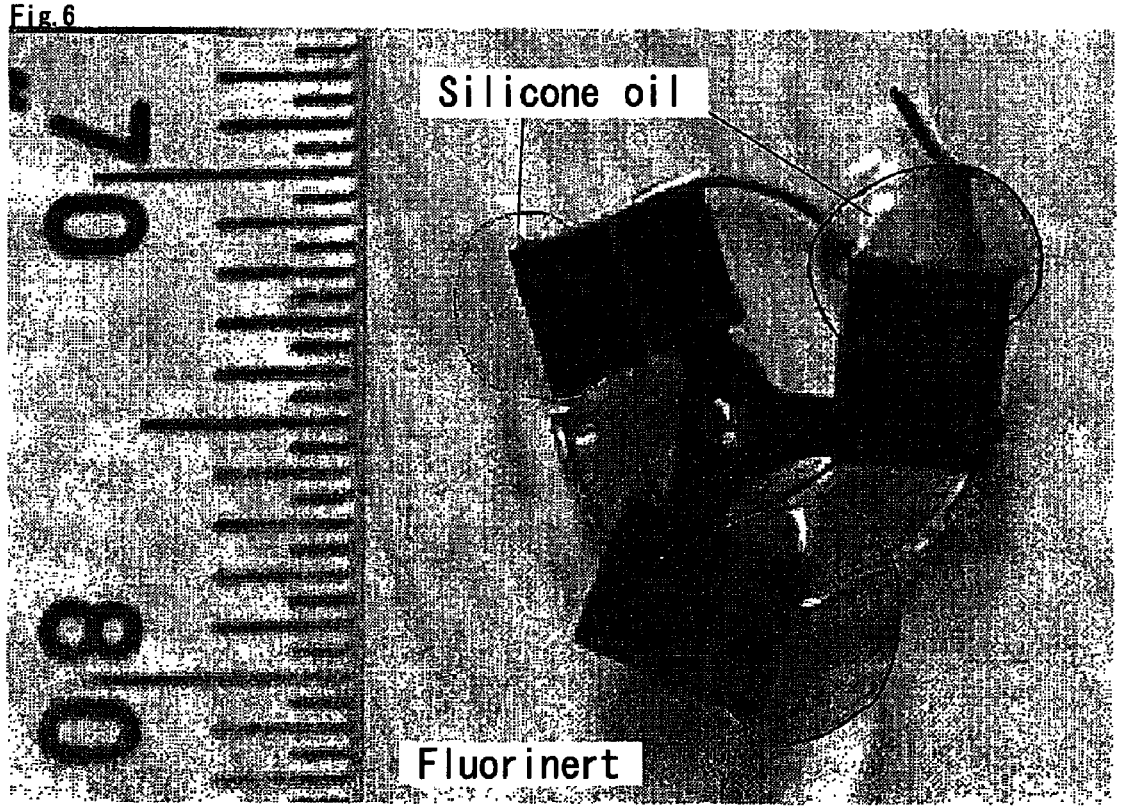
FIG. 6 shows an example of trial manufacture of a rotary mechanism employing two-fluid surface tension difference convection as a drive force.

FIG. 6 shows an example of trial manufacture of a device for creating rotary force wherein the surface tension difference convection of this silicone oil/Fluorinert system is applied as a drive force. Although the wettability of both silicone oil and Fluorinert is good, silicone oil is somewhat more easily wetted, so the main body of the turbine was constructed of plastic sheet utilizing this minute difference of wettability and polytetrafluoroethylene seals were stuck on only on one respective side of the three vanes. When this turbine was floated on the Fluorinert and red-colored silicone oil drops were attached, using an injector, only on the aforesaid seals as shown in FIG. 6, the turbine spontaneously commenced rotation. Since convection currents of these two fluids are generated in mutually opposing form at the silicone oil and Fluorinert interface, the turbine is rotated by the reaction thereof.

Figure 7:
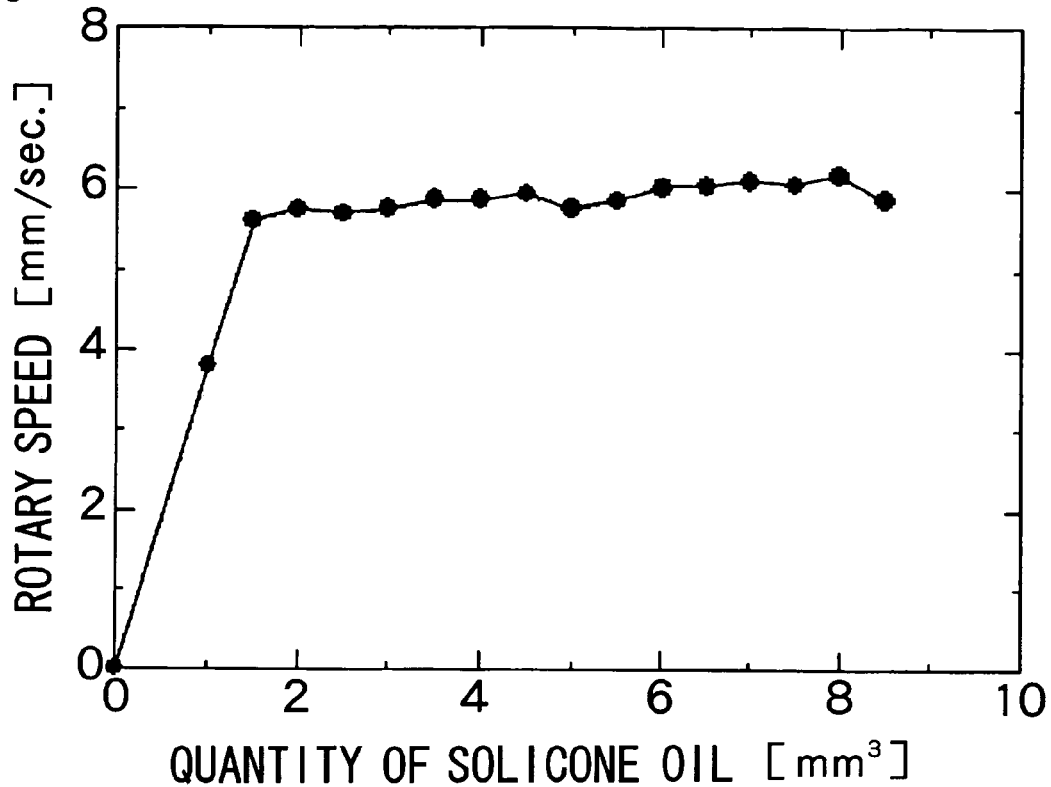
FIG. 7 is a graph showing the relationship between the silicone oil drop quantity and speed of rotation in a Fluorinert/silicone oil system.

The graph shown in FIG. 7 shows the effect of the quantity of silicone oil on the tip speed of the turbine. The experimental values were plotted taking the quantity of silicone oil along the horizontal axis and the circumferential speed of the portion of maximum diameter of the turbine along the vertical axis. As can be seen from the scale in the Figure, the portion of maximum diameter has a radius of about 6 mm. It was found that the rotational speed increased up to 1.8 $mm^3$ of silicone oil but with more silicone oil than this the rotational speed became substantially constant at about 6 mm/sec.

Figure 8:
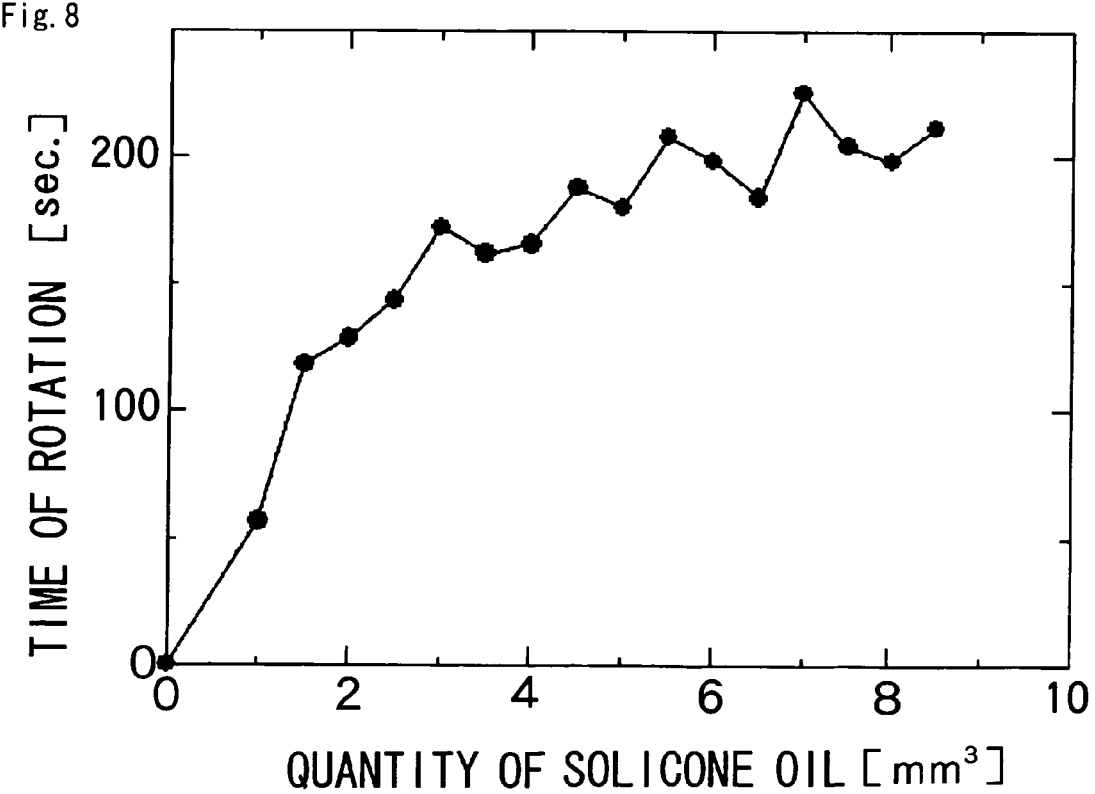
FIG. 8 is a graph showing the relationship between the silicone oil drop quantity and time of rotation in a Fluorinert/silicone oil system.

FIG. 8 shows the relationship between the quantity of silicone oil and the time taken for the turbine rotation to stop. These tests confirmed that with a quantity of 8 $mm^2$ rotation continued for about 200 sec.

Embodiment 2

Figure 9:
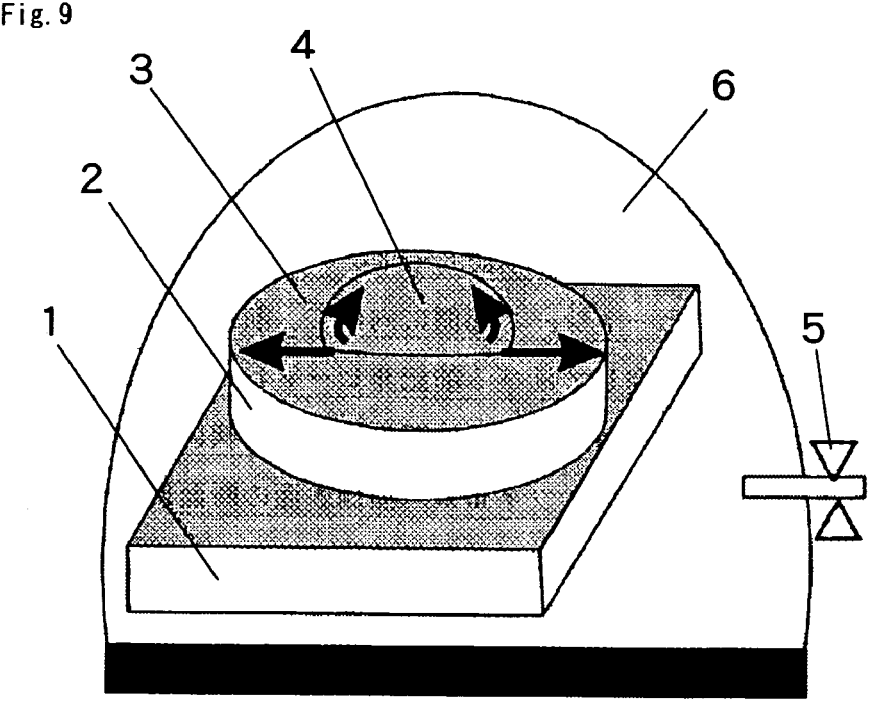
FIG. 9 is a view showing a device for observing the relationship between the two-fluid surface tension difference drive flow and the Fluorinert vapor pressure in a Fluorinert/silicone oil system.

FIG. 9 shows an example in which the flow rate of surface tension difference flow generated in two fluids having an interface is controlled. The Fluorinert 3 was placed in a dish 2 placed on a weighing machine 1. Surface tension difference convection was spontaneously generated in the direction indicated by the arrows when a liquid drop of silicone oil 4 was placed thereon. The environment thereabove was then sealed by arranging in a hermetically sealed container 6. It was confirmed that this surface tension difference drive flow ceased when the vapor pressure of the Fluorinert vapor in the hermetically sealed container 6 became saturated. The convection rate could be controlled by controlling the quantity of Fluorinert vapor in the hermetically sealed container by using a valve 5 provided in the hermetically sealed container 6.

Embodiment 3

Figure 10:
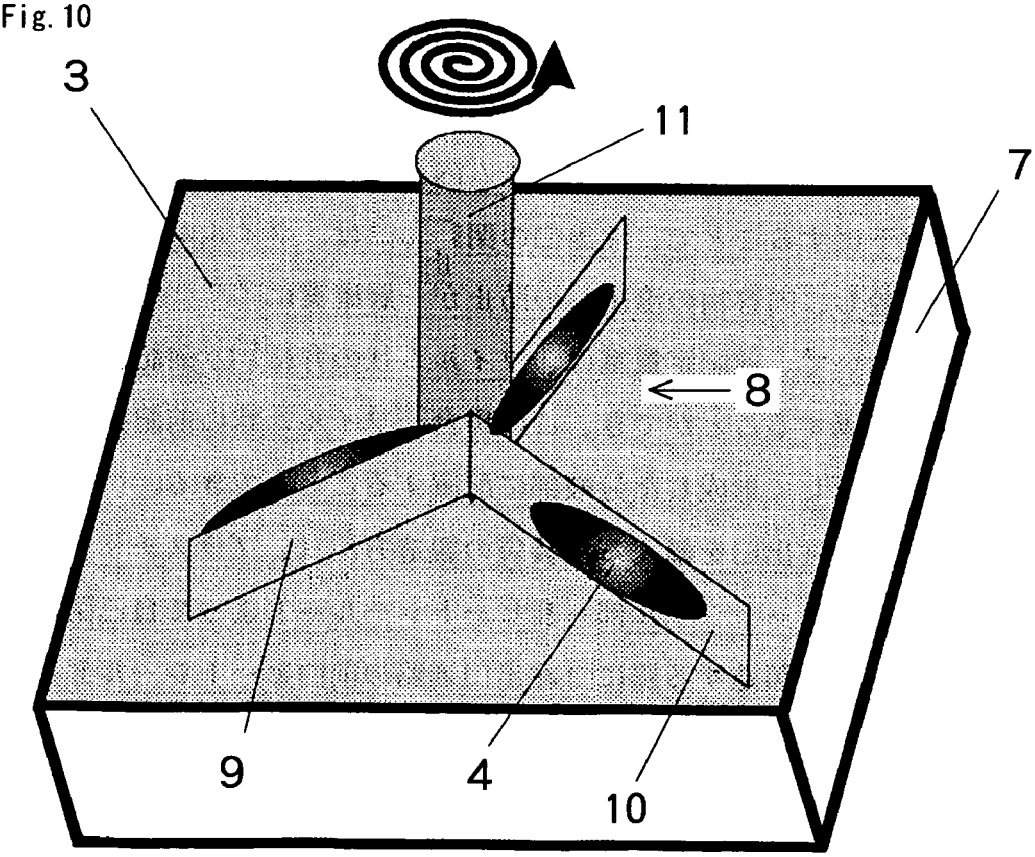
FIG. 10 is a view showing a mechanism for creating rotary movement from the surface tension difference drive flow of two fluids having an interface.

FIG. 10 shows an embodiment in which rotary movement is created from surface tension difference convection. Fluorinert 3 was placed in a container 7. A turbine 8 was floated on the Fluorinert 3. Surface treatment such as coating was applied to the faces 9 on one side of the turbine 8 so as to confer a poor wettability characteristic so that the silicone oil would not become attached thereto. In contrast, the other faces 10 of the turbine 8 were partially provided with a good wettability characteristic so that the silicone oil could easily become attached to these portions. Thus the silicone oil 4 was attached to these portions and, as described above, the turbine 8 was driven in rotation by generation of surface tension difference drive flow at the portions where this silicone oil 4 and Fluorinert 3 came into contact. The rotary force of the turbine 8 was transmitted to a micromachine through a rotary shaft 11. Since this rotary element utilizes the reaction of the flow of a fluid, in the case of overloading, idle rotation of the turbine can take place at the portions that contact this fluid, so the overloading can be dissipated. This rotor element can therefore be employed as a minute rotary element that is capable of performing idle rotation, which was difficult to achieve in the manufacture of a conventional drive mechanism.

Embodiment 4

Figure 11:
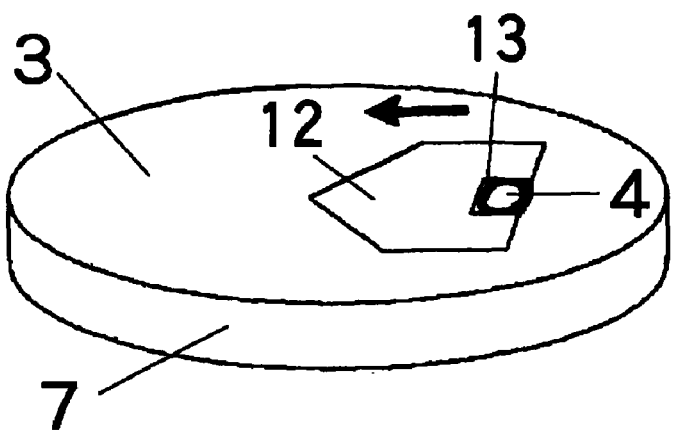
FIG. 11 is a view showing a mechanism for creating linear movement from the surface tension difference drive flow of two fluids having an interface.

FIG. 11 shows an embodiment in which linear movement is created from surface tension difference convection. A boat-shaped sheet 12 made of thin sheet is floated on the liquid surface of Fluorinert 3 placed in a container 7. The boat-shaped sheet 12 is treated to achieve poor wettability but a region 13 thereof is created having partially good wettability. As a result of this wettability distribution, a silicone oil drop 4 adheres to the region 13. Due to the surface tension difference drive flow generated in the two fluids, the boat-shaped sheet 12 advances in the direction of the arrow. It should be noted that, since the treatment to create portions of good wettability and portions of poor wettability is intended essentially to retain the silicone oil drop in the desired location, although treatment to produce good wettability of this portion is necessary, it is not necessary that the region where treatment to produce poor wettability is performed should be the entirety of the remaining region; it suffices if the periphery of the location where it is desired to retain the silicone oil drops is treated.

Also, the speed of movement can be controlled by adjusting the amount of Fluorinert vapor in the container atmosphere by arranging the mechanism of the rotary movement and the linear movement described above in a hermetically sealed container.

Embodiment 5

Figure 12:
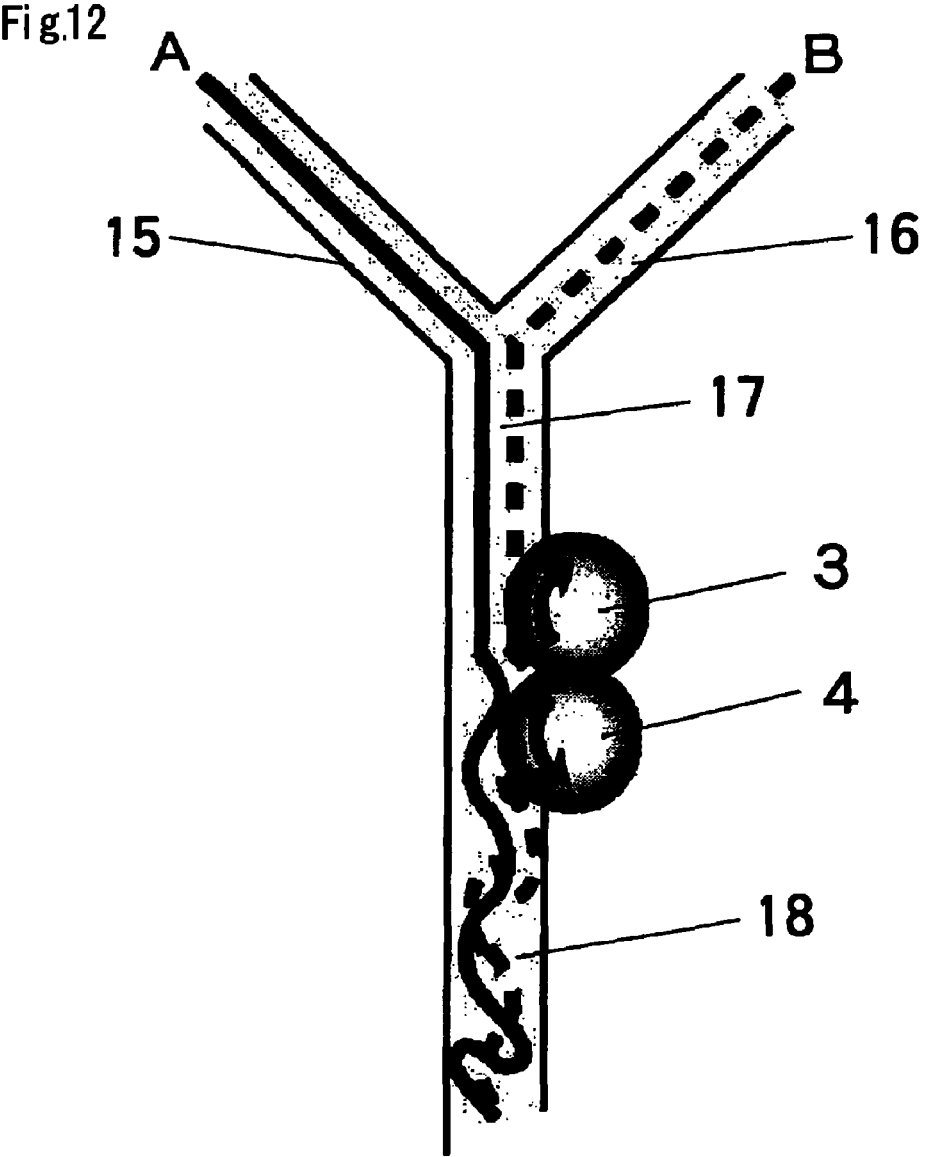
FIG. 12 is a micro-stirrer employing surface tension difference drive flow as stirring and mixing means for μTAS.

FIG. 12 shows an example of application to a stirring device for a microreactor, typically a μTAS. When mixing two fluids, fluid A and fluid B, in a microchannel such as in a μTAS or other microreactor, it is known that, due to the micro scale, the respective fluids flow in a laminar flow condition through a single channel with no mixing at all; when mixing for example a reagent with a sample, solution of this problem therefore presents a considerable challenge. Parenthetically, the channel width of a μTAS is typically about 100 to 500 μm. FIG. 12 therefore illustrates a method of solving this problem using surface tension difference convection of the present Fluorinert/silicone oil system. Liquid A flows through the channel 15, liquid B flows through the channel 16 and liquid A and liquid B meet in the portion of the channel 17. However, liquid A and liquid B do not mix in the microchannel but flow in parallel in a laminar flow condition. In order to solve this problem, the Fluorinert 3 and silicone oil 4 spontaneously generate flow when a drop of Fluorinert 3 and a drop of silicone oil 4 are brought into contact in the channel 17, which is an open channel; these respective convection currents thereby produce mixing of the liquid A and liquid B flowing in parallel through the channel 17. The Figure shows that, as a result, liquid A and liquid B are in a mixed condition in the channel 18 on the downstream side thereof.

The invention relating to a drive method and drive mechanism employing surface tension difference convection proposed in the present specification has characteristic advantages including for example that it does not require troublesome energy supply and has no mechanical structural components at all, so that, in principle, indefinitely small drive force can be obtained, and also that starting and stopping of surface flow and the flow speed can be controlled by controlling the Fluorinert concentration in the atmosphere. The present invention can therefore be applied not merely to a stirring device for a microreactor such as μTAS as specifically illustrated in the specification but also to various types of processing or treatment in the micro world in a wide range, such as the semiconductor field or medical field.

What is claimed is:

1. A method wherein the surface tension difference convection generated at the two-fluid interface of silicone oil and Fluorinert is utilized as the drive force of a micromachine.

2. The method according to claim 1 wherein the speed of the surface tension difference convection is controlled by adjusting the temperature difference between the silicone oil and Fluorinert.

3. The method according to claim 1 wherein the speed of the surface tension difference convection is controlled by adjusting the Fluorinert vapor pressure at the interface region of the silicone oil and Fluorinert.

4. A rotary drive mechanism wherein the surface tension difference convection generated at a two-fluid interface is utilized as the drive force of a micro-turbine by floating said micro-turbine on a Fluorinert liquid surface and attaching silicone oil to faces facing respectively in the same direction of this micro-turbine.

5. The drive mechanism according to claim 4 wherein, of the surface of the drive member to which the silicone oil is attached, only regions where silicone oil is to be attached are treated with a material of good wettability and the peripheral region thereof is treated with material of poor wettability so that a silicone oil drop adheres thereto.

6. A unidirectional drive mechanism wherein a minute thin sheet is floated on a Fluorinert liquid surface and silicone oil is attached to one end of this minute thin sheet, thereby utilizing the surface tension difference convection generated at the two-fluid interface as the drive force of said minute thin sheet.

7. The drive mechanism according to claim 6 wherein, of the surface of the drive member to which the silicone oil is attached, only regions where silicone oil is to be attached are treated with a material of good wettability and the peripheral region thereof is treated with material of poor wettability so that the silicone oil drops adhere thereto.

8. A method of stirring and mixing a plurality of fluids by inserting liquid drops of silicone oil and Fluorinert in a microchannel in which the plurality of fluids are flowing in a laminar flow condition, and performing stirring and mixing by surface tension difference convection generated at the interface of these two fluids.

9. The method according to claim 8 wherein the speed of the surface tension difference convection is controlled by adjusting the temperature difference between the silicone oil and the Fluorinert.

10. The method according to claim 8 wherein the speed of the surface tension difference convection is controlled by adjusting the Fluorinert vapor pressure at the interface region of the silicone oil and Fluorinert.

11. A method of stirring and mixing a sample and reagent by inserting liquid drops of silicone oil and Fluorinert in a mixing region of the sample and reagent on a μTAS chip and performing stirring and mixing by surface tension difference convection generated at this two-fluid interface.

* * * * *